(12) United States Patent
Li et al.

(10) Patent No.: US 10,955,708 B2
(45) Date of Patent: Mar. 23, 2021

(54) CURVED DISPLAY PANEL

(71) Applicant: WUHAN CHINA STAR OPTOELECTRONICS TECHNOLOGY CO., LTD., Wuhan (CN)

(72) Inventors: Xueyun Li, Wuhan (CN); Yuejun Tang, Wuhan (CN)

(*) Notice: Subject to any disclaimer, the term of this patent is extended or adjusted under 35 U.S.C. 154(b) by 23 days.

(21) Appl. No.: 16/613,123

(22) PCT Filed: Oct. 21, 2019

(86) PCT No.: PCT/CN2019/112189
§ 371 (c)(1),
(2) Date: Nov. 13, 2019

(87) PCT Pub. No.: WO2021/003882
PCT Pub. Date: Jan. 14, 2021

(65) Prior Publication Data
US 2021/0011344 A1    Jan. 14, 2021

(30) Foreign Application Priority Data
Jul. 11, 2019 (CN) .......................... 201910622711.5

(51) Int. Cl.
*G02F 1/1343* (2006.01)
*G02F 1/1335* (2006.01)

(52) U.S. Cl.
CPC .. *G02F 1/134309* (2013.01); *G02F 1/133512* (2013.01); *G02F 1/133514* (2013.01); *G02F 2201/123* (2013.01); *G02F 2201/56* (2013.01)

(58) Field of Classification Search
CPC ......... G02F 1/134309; G02F 1/133514; G02F 1/133512; G02F 2201/123; G02F 2201/56
USPC ........................................... 349/106
See application file for complete search history.

(56) References Cited

U.S. PATENT DOCUMENTS

| 2016/0282664 | A1  | 9/2016 | Wu |
| 2018/0180948 | A1  | 6/2018 | Zhao |
| 2019/0101785 | A1* | 4/2019 | Araki .................. H01L 51/5012 |

FOREIGN PATENT DOCUMENTS

| CN | 104375310 A | 2/2015 |
| CN | 104614890 A | 5/2015 |
| CN | 106200069 A | 12/2016 |
| CN | 108132560 A | 6/2018 |
| CN | 109445166 A | 3/2019 |

* cited by examiner

*Primary Examiner* — Nathanael R Briggs
*Assistant Examiner* — William D Peterson (57) ABSTRACT

A curved display panel comprises a curved color filter substrate, a curved array substrate, and a plurality of pixel modules. In each pixel module in the side area of the curved display panel, distances from an orthographic projection of the pixel electrode on the curved color filter substrate to the two light shielding blocks are D1 and D2, when the curved display panel is in a flat state, D1 is not equal to D2, and when the curved display panel is in a curved state, D1 is equal to D2.

18 Claims, 5 Drawing Sheets

CURVED DISPLAY PANEL

FIELD OF INVENTION

The present disclosure relates to the field of display technologies, and more particularly to a curved display panel.

BACKGROUND OF INVENTION

Figure 1:
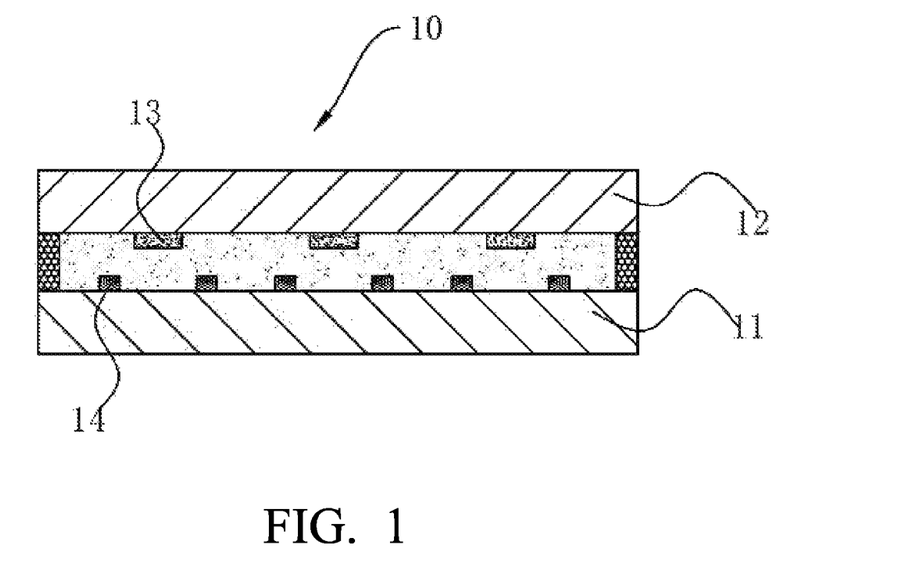
FIG. 1 is a schematic structural diagram of a curved liquid crystal display panel in a flat state in prior art.

A curved liquid crystal display panel is a core component of a curved liquid crystal display device. As shown in FIG. 1, current curved liquid crystal display panels 10 generally comprise a color filter (CF) substrate 11 and a thin film transistor (TFT) substrate 12 disposed opposite to the CF substrate. The TFT substrate 12 is provided with a plurality of pixel electrodes 13 arranged at intervals. The CF substrate 11 is provided with a black matrix which is formed of a black color resist material, the black matrix comprises a plurality of light shielding portions 14 arranged at intervals, and the light shielding portions 14 and the pixel electrodes 13 are interlacedly disposed. When the curved liquid crystal display panel 10 is in a flat state, a distance between a light shielding portion 14 and a corresponding pixel electrode 13 is a default value.

Figure 2:
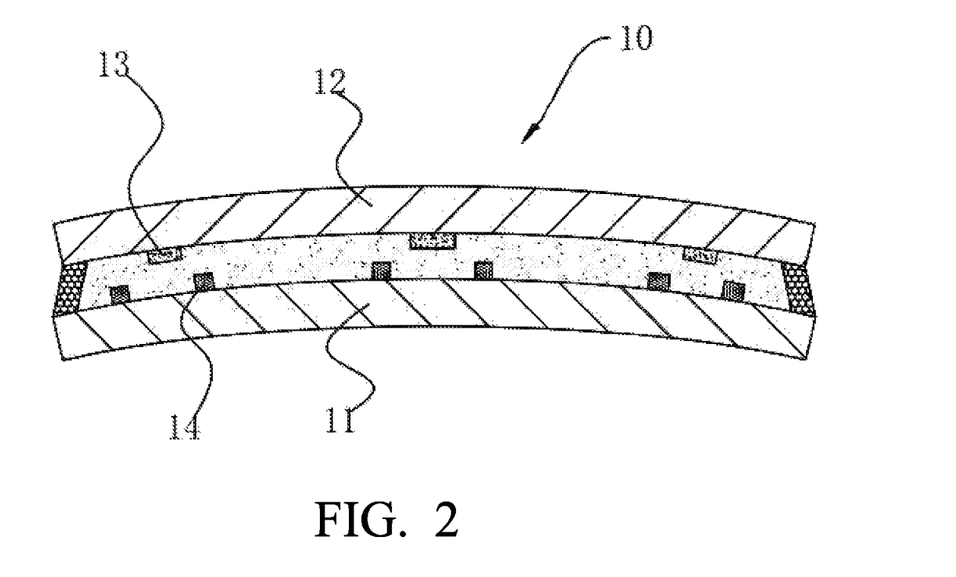
FIG. 2 is a schematic structural diagram of a curved liquid crystal display panel in a curved state in prior art.

However, as shown in FIG. 2, when the curved liquid crystal display panel 10 is in a curved state, the curved liquid crystal display panel 10 has a predetermined radian. Outside the center, the curved liquid crystal display panel will generate left and right sliding stresses based on the center that leads to a relative shift between the TFT substrate 12 and the CF substrate 11, thereby causing a greater relative shift between the light shielding portions 14 and the pixel electrodes 13. It will cause color shift, dark-state light leakage, and nonuniform brightness when a viewer obliquely watches the curved liquid crystal display panel, and result in decreased display quality.

During the bending process of curved liquid crystal display panels, a greater relative shift produced between the light shielding portions and the pixel electrodes causes color shift, dark-state light leakage, and nonuniform brightness when a viewer obliquely watches the curved liquid crystal display panel, and results in a decrease of display quality.

SUMMARY OF INVENTION

An embodiment of the present disclosure provides a curved display panel. The curved display panel comprises a curved color filter substrate, a curved array substrate, and a liquid crystal layer; wherein the curved display panel is formed by bending a flat display panel; the curved array substrate is provided with a plurality of pixel electrodes disposed at intervals, the curved color filter substrate is provided with a plurality of light shielding blocks disposed at intervals, and the light shielding blocks and the pixel electrodes are interlacedly disposed; the curved display panel comprises a plurality of pixel modules, and each of the pixel modules comprises one of the pixel electrodes and two of the light shielding blocks which are disposed on both sides of the adjacent pixel electrode.

The curved display panel comprises a middle area and a side area disposed on both sides of the middle area; in each pixel module in the side area of the curved display panel, distances from an orthographic projection of the pixel electrode on the curved color filter substrate to the two light shielding blocks are D1 and D2, when the curved display panel is in a flat state, D1 is not equal to D2, and when the curved display panel is in a curved state, D1 is equal to D2.

When the curved display panel is in a curved state, the curved color filter substrate and the curved array substrate have straight edges and curved edges, a distance in the horizontal direction between the straight edges of the curved color filter substrate and the corresponding straight edges of the curved array substrate is L, and in each of the pixel modules, an absolute value of a difference between D1 and D2 is less than or equal to L; when the curved display panel is in a flat state, a less distance between the pixel modules and the middle area, the absolute value of the difference between D1 and D2 is less.

In an embodiment of the present disclosure, in each pixel module in the middle area of the curved display panel, distances from an orthographic projection of the pixel electrode on the curved color filter substrate to the two light shielding blocks are D3 and D4, and when the curved display panel is in a flat or curved state, D3 is equal to D4.

In an embodiment of the present disclosure, the side area of the curved display panel comprises a left-side area disposed on a left side of the middle area, and a right-side area disposed on a right side of the middle area; in each pixel module in the left-side area of the curved display panel, a distance from the orthographic projection of the pixel electrode on the curved color filter substrate to a light shielding block on the left side of the pixel electrode is D11, and a distance from the orthographic projection of the pixel electrode on the curved color filter substrate to a light shielding block on the right side of the pixel electrode is D21; when the curved display panel is in a flat state, D11 is not equal to D21, and when the curved display panel is in a curved state, D11 is equal to D21.

In an embodiment of the present disclosure, in each pixel module in the right-side area of the curved display panel, a distance from the orthographic projection of the pixel electrode on the curved color filter substrate to a light shielding block on the left side of the pixel electrode is D12, and a distance from the orthographic projection of the pixel electrode on the curved color filter substrate to a light shielding block on the right side of the pixel electrode is D22; when the curved display panel is in a flat state, D12 is not equal to D22, and when the curved display panel is in a curved state, D12 is equal to D22.

In an embodiment of the present disclosure, a display surface of the curved display panel is a concave surface, and when the curved display panel is in a flat state, D21 is greater than D11, and D12 is greater than D22.

In an embodiment of the present disclosure, a display surface of the curved display panel is a convex surface, and when the curved display panel is in a flat state, D21 is less than D11, and D12 is less than D22.

In an embodiment of the present disclosure, the pixel modules in the left-side area of the curved display panel and the pixel modules in the right-side area of the curved display panel are symmetric with respect to the middle area.

In an embodiment of the present disclosure, when the curved display panel is in a flat state, in the pixel modules which have a greatest distance to the middle area, the absolute value of the difference between D1 and D2 is a half of L.

An embodiment of the present disclosure further provides a curved display panel. The curved display panel comprises a curved color filter substrate, a curved array substrate, and a liquid crystal layer; wherein the curved display panel is formed by bending a flat display panel; the curved array substrate is provided with a plurality of pixel electrodes disposed at intervals, the curved color filter substrate is provided with a plurality of light shielding blocks disposed at intervals, and the light shielding blocks and the pixel electrodes are interlacedly disposed; the curved display panel comprises a plurality of pixel modules, and each of the pixel modules comprises one of the pixel electrodes and two of the light shielding blocks which are disposed on both sides of the adjacent pixel electrode; wherein the curved display panel comprises a middle area and a side area disposed on both sides of the middle area; in each pixel module in the side area of the curved display panel, distances from an orthographic projection of the pixel electrode on the curved color filter substrate to the two light shielding blocks are D1 and D2, when the curved display panel is in a flat state, D1 is not equal to D2, and when the curved display panel is in a curved state, D1 is equal to D2.

In an embodiment of the present disclosure, in each pixel module in the middle area of the curved display panel, distances from an orthographic projection of the pixel electrode on the curved color filter substrate to the two light shielding blocks are D3 and D4, and when the curved display panel is in a flat or curved state, D3 is equal to D4.

In an embodiment of the present disclosure, the side area of the curved display panel comprises a left-side area disposed on a left side of the middle area, and a right-side area disposed on a right side of the middle area; in each pixel module in the left-side area of the curved display panel, a distance from the orthographic projection of the pixel electrode on the curved color filter substrate to a light shielding block on the left side of the pixel electrode is D11, and a distance from the orthographic projection of the pixel electrode on the curved color filter substrate to a light shielding block on the right side of the pixel electrode is D21; when the curved display panel is in a flat state, D11 is not equal to D21, and when the curved display panel is in a curved state, D11 is equal to D21.

In an embodiment of the present disclosure, in each pixel module in the right-side area of the curved display panel, a distance from the orthographic projection of the pixel electrode on the curved color filter substrate to a light shielding block on the left side of the pixel electrode is D12, and a distance from the orthographic projection of the pixel electrode on the curved color filter substrate to a light shielding block on the right side of the pixel electrode is D22; when the curved display panel is in a flat state, D12 is not equal to D22, and when the curved display panel is in a curved state, D12 is equal to D22.

In an embodiment of the present disclosure, a display surface of the curved display panel is a concave surface, and when the curved display panel is in a flat state, D21 is greater than D11, and D12 is greater than D22.

In an embodiment of the present disclosure, a display surface of the curved display panel is a convex surface, and when the curved display panel is in a flat state, D21 is less than D11, and D12 is less than D22.

In an embodiment of the present disclosure, the pixel modules in the left-side area of the curved display panel and the pixel modules in the right-side area of the curved display panel are symmetric with respect to the middle area.

In an embodiment of the present disclosure, when the curved display panel is in a curved state, the curved color filter substrate and the curved array substrate have straight edges and curved edges, a distance in the horizontal direction between the straight edges of the curved color filter substrate and the corresponding straight edges of the curved array substrate is L, and in each of the pixel modules, an absolute value of a difference between D1 and D2 is less than or equal to L.

In an embodiment of the present disclosure, when the curved display panel is in a flat state, in the pixel modules which have a greatest distance to the middle area, the absolute value of the difference between D1 and D2 is a half of L.

In an embodiment of the present disclosure, when the curved display panel is in a flat state, a less distance between the pixel modules and the middle area, the absolute value of the difference between D1 and D2 is less.

The embodiments of the present disclosure compensate the displacement between the pixel electrodes and the corresponding light shielding blocks caused by dislocation or relative shifts between the curved array substrate and the color filter substrate during the process of bending the flat display panel into the curved display panel by designing the distance between the pixel electrodes in the sub-pixels and the light shielding blocks on the left and right sides to be asymmetrical in the side area of the flat display panel, thereby preventing color shift, dark-state light leakage, and nonuniform brightness when a viewer obliquely watches the side area of the curved liquid crystal display panel that causing a decrease of display quality. It can improve optical quality of the curved display panel without increasing the number of masks.

DESCRIPTION OF DRAWINGS

The accompanying figures to be used in the description of embodiments of the present disclosure or prior art will be described in brief to more clearly illustrate the technical solutions of the embodiments or the prior art. The accompanying figures described below are only part of the embodiments of the present disclosure, from which those skilled in the art can derive further figures without making any inventive efforts.

DETAILED DESCRIPTION OF PREFERRED EMBODIMENTS

The embodiments of the present disclosure are described in detail hereinafter. Examples of the described embodiments are given in the accompanying drawings, wherein the identical or similar reference numerals constantly denote the identical or similar elements or elements having the identical or similar functions. In the description of the present disclosure, it should be understood that terms such as "upper," "lower," "front," "rear," "left," "right," "inside," "outside," "side," as well as derivative thereof should be construed to refer to the orientation as then described or as shown in the drawings under discussion. These relative terms are for convenience of description, do not require that the present disclosure be constructed or operated in a particular orientation, and shall not be construed as causing limitations to the present disclosure.

The present disclosure provides a solution for current curved liquid crystal display panels. During the bending process of current curved liquid crystal display panels, outside the center, the curved liquid crystal display panel will generate left and right sliding stresses based on the center that leads to a relative shift between the TFT substrate and the CF substrate, thereby causing a greater relative shift between the light shielding portions and the pixel electrodes. It will cause color shift, dark-state light leakage, and nonuniform brightness when a viewer obliquely watches the curved liquid crystal display panel, and result in decreased display quality. An embodiment of the present can solve the above problem.

EMBODIMENT 1

Figure 3:
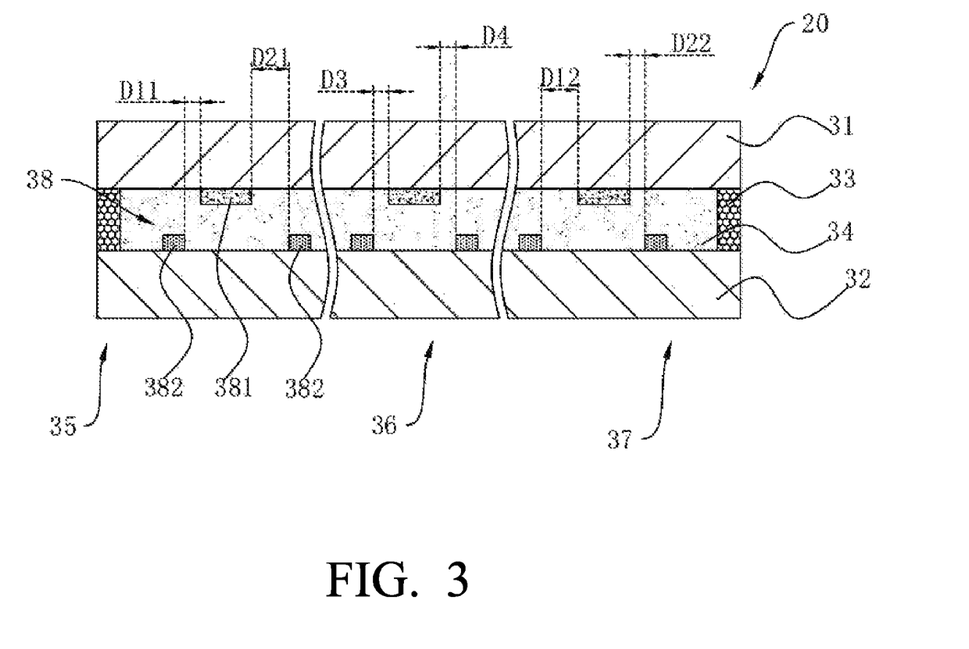
FIG. 3 is a schematic structural diagram of a flat display panel according to embodiment 1 of the present disclosure.
Figure 4:
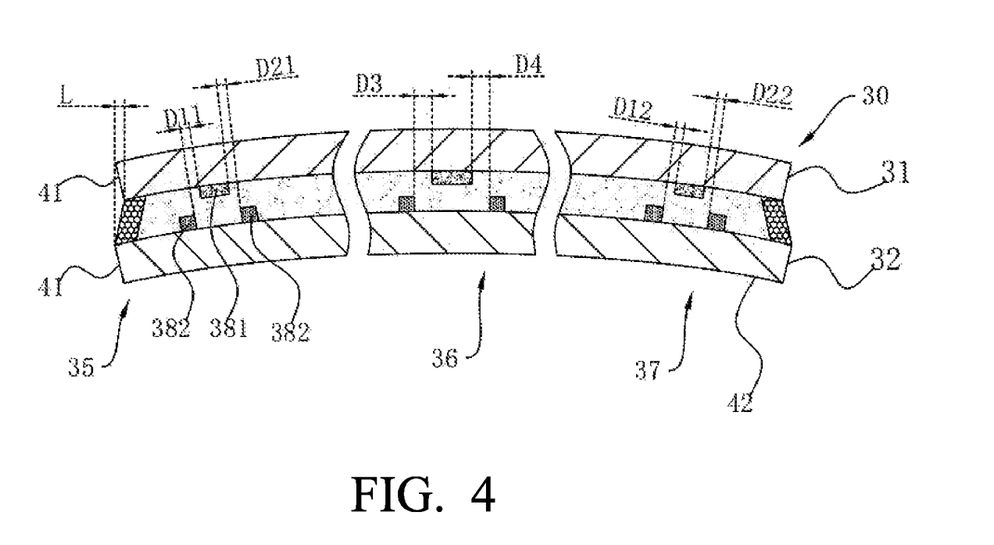
FIG. 4 is a schematic structural diagram of a curved display panel according to embodiment 1 of the present disclosure.

An embodiment of the present disclosure provides a curved display panel. As shown in FIG. 3 and FIG. 4, a curved display panel 30 is formed by bending a flat display panel 20. The curved display panel 30 comprises a curved color filter substrate 32, a curved array substrate 31, and a liquid crystal layer 34 and a frame glue 33 disposed between the curved color filter substrate 32 and the curved array substrate 31; the frame glue 33, the curved color filter substrate 32, and the curved array substrate 31 directly form an accommodating chamber that accommodates the liquid crystal layer 34.

Specifically, a surface that light emits from of the curved display panel 30 is a side surface of the curved color filter substrate 32 away from the curved array substrate 31. The surface that light emits from of the curved display panel 30 is a concave surface.

Specifically, a black matrix and a plurality of sub-pixels arranged at intervals are disposed between the curved array substrate 31 and the curved color filter substrate 32. The black matrix comprises light shielding blocks disposed in the gaps among the adjacent sub-pixels.

Specifically, the sub-pixels comprise pixel electrodes 381 disposed on the curved array substrate 31, a plurality of the light shielding blocks are disposed at intervals on the curved color filter substrate 32, and the light shielding blocks and the pixel electrodes 381 are interlacedly disposed along the longitudinal direction of the curved edges of the curved display panel 30.

the curved display panel 30 comprises a plurality of pixel modules 38, and each of the pixel modules 38 comprises one of the pixel electrodes 381 and two of the light shielding blocks 382 which are disposed on both sides of the adjacent pixel electrode 381.

Specifically, the curved display panel 30 comprises a middle area 36 and a side area disposed on both sides of the middle area; in each pixel module 38 in the side area of the curved display panel 30, distances from an orthographic projection of the pixel electrode 381 on the curved color filter substrate 32 to the two light shielding blocks 382 are D1 and D2.

In an embodiment of the present disclosure, when the curved display panel 30 is in a flat state (as shown in FIG. 3), D1 is not equal to D2, and when the curved display panel 30 is in a curved state (as shown in FIG. 4), D1 is equal to D2.

When the curved display panel 30 is in a flat state, that is, when the flat display panel 20 is not bent, designing the distance between the pixel electrodes 381 in the sub-pixels and the light shielding blocks on the left and right sides to be asymmetrical in the side area of the curved display panel 30 to compensate the displacement between the pixel electrodes 381 and the corresponding light shielding blocks caused by dislocation or relative shifts between the curved array substrate 31 and the color filter substrate during the process of bending the flat display panel 20 into the curved display panel 30, thereby preventing color shift, dark-state light leakage, and nonuniform brightness when a viewer obliquely watches the side area of the curved liquid crystal display panel that causing a decrease of display quality. It can improve optical quality of the curved display panel 30 without increasing the number of masks.

It should be noted that, in actual implementation, it also can set D1 about equal to D2 when the curved display panel 30 is in a curved state. The values of D1 and D2 can be determined according to the size, bending degree, or other actual conditions of the curved display panel 30.

Further, the side area of the curved display panel 30 comprises a left-side area 35 disposed on a left side of the middle area 36, and a right-side area 37 disposed on a right side of the middle area 36.

in each pixel module 38 in the left-side area 35 of the curved display panel 30, a distance from the orthographic projection of the pixel electrode 381 on the curved color filter substrate 32 to a light shielding block 382 on the left side of the pixel electrode 381 is D11, and a distance from the orthographic projection of the pixel electrode 381 on the curved color filter substrate 32 to a light shielding block 382 on the right side of the pixel electrode 381 is D21; when the curved display panel 30 is in a flat state, D11 is not equal to D21, and when the curved display panel 30 is in a curved state, D11 is equal to D21.

Further, in each pixel module 38 in the right-side area 37 of the curved display panel 30, a distance from the orthographic projection of the pixel electrode 381 on the curved color filter substrate 32 to a light shielding block 382 on the left side of the pixel electrode 381 is D12, and a distance from the orthographic projection of the pixel electrode 381 on the curved color filter substrate 32 to a light shielding block 382 on the right side of the pixel electrode 381 is D22. When the curved display panel 30 is in a flat state, D12 is not equal to D22, and when the curved display panel 30 is in a curved state, D12 is equal to D22.

It should be noted that, in actual implementation, it also can set D11 about equal to D21 and D12 about equal to D22 when the curved display panel 30 is in a curved state.

Specifically, in each pixel module 38 in the middle area 36 of the curved display panel 30, distances from an orthographic projection of the pixel electrode 381 on the curved color filter substrate 32 to the two light shielding blocks 382 are D3 and D4, and when the curved display panel 30 is in a flat state or a curved state, D3 is equal to D4.

Further, when the curved display panel 30 is in a flat state, D21 is greater than D11, and D12 is greater than D22.

It should be noted that, for the skilled in the art, when the surface that light emits from of the curved display panel 30 is a concave surface, during the process of bending the flat display panel 20 into the curved display panel 30, the left end of the curved array substrate 31 relatively shifts to right, and the right end relatively shifts to left. It can prevent bad phenomenon in the curved liquid crystal display panel, such as light leakage when obliquely viewing, caused by a greater relative shift produced between the light shielding blocks and the pixel electrodes 381 in the pixel modules 38 by setting D21 greater than D11, and D12 greater than D22 when the curved display panel 30 is in a flat state. Therefore, due to displacement compensation, D21 is equal to or is about equal to D11, and D12 is equal to or is about equal to D22 when the flat display panel 20 is bent to the curved display panel 30.

Specifically, the pixel modules 38 in the left-side area 35 of the curved display panel 30 and the pixel modules 38 in the right-side area 37 of the curved display panel 30 are symmetric with respect to the middle area 36 to improve optical quality of the curved display panel 30.

Specifically, as shown in FIG. 4, when the curved display panel 30 is in a curved state, the curved color filter substrate 32 and the curved array substrate 31 have straight edges 41 and curved edges 42.

It should be note that, when the curved display panel 30 is in a curved state, a side having a straight shape is a straight edge 41, and a side having a curved shape is a curved edge 42. The straight edge 41 on the left side of the curved color filter substrate 32 corresponds to the straight edge 41 on the left side of the curved array substrate 31, and the straight edge 41 on the right side of the curved color filter substrate 32 corresponds to the straight edge 41 on the right side of the curved array substrate 31.

Further, a distance in the horizontal direction between the straight edges 41 of the curved color filter substrate 32 and the corresponding straight edges 41 of the curved array substrate 31 is L, and in each of the pixel modules 38, an absolute value of a difference between D1 and D2 is less than or equal to L.

It should be noted that, for the skilled in the art, the distances between the terminals of the curved array substrate 31 and the curved color filter substrate 32 are the greatest relative displacement during the process of bending the flat display panel 20 into the curved display panel 30. It can prevent bad phenomenon of color shift, dark-state light leakage, and nonuniform brightness in the curved liquid crystal display panel caused by excessive displacement compensation after bending by setting the absolute value of the difference between D1 and D2 less than or equal to L.

Figure 5:
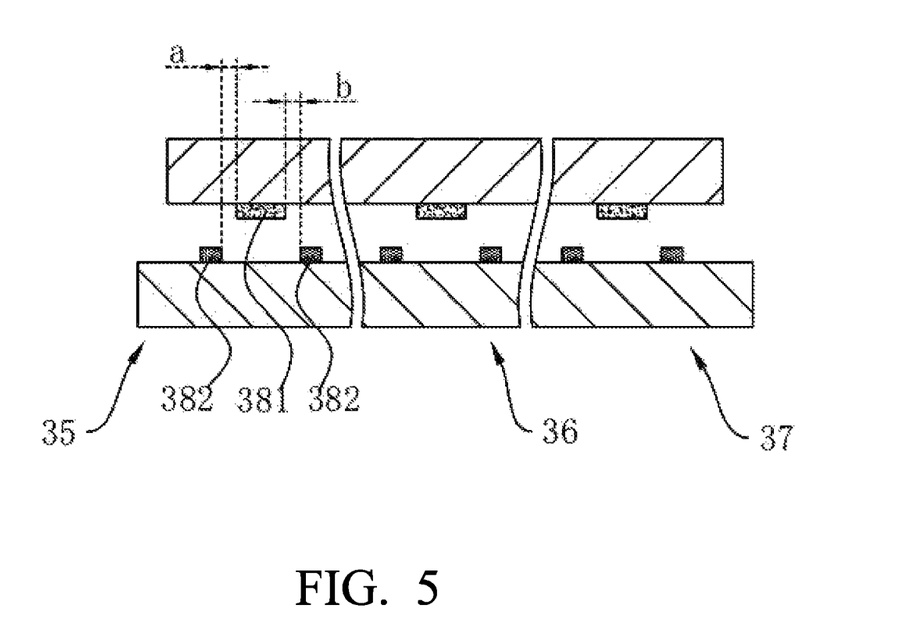
FIG. 5 is a schematic structural diagram of an orthographic projection of the curved array substrate and the curved color filter substrate in the horizontal plane according to embodiment 1 of the present disclosure.

In an embodiment of the present disclosure, as shown in FIG. 5, FIG. 5 is a schematic structural diagram of an orthographic projection of the curved array substrate 31 and the curved color filter substrate 32 in the horizontal plane according to embodiment 1 of the present disclosure. In each of the pixel modules 38, distances from the pixel electrode 381 to the adjacent light shielding blocks are a and b, respectively. When a is equal to or is about equal to b, it can obtain better display quality and improve optical quality of the curved display panel 30 no matter when a viewer obliquely watches the curved display panel 30 or not.

Figure 6:
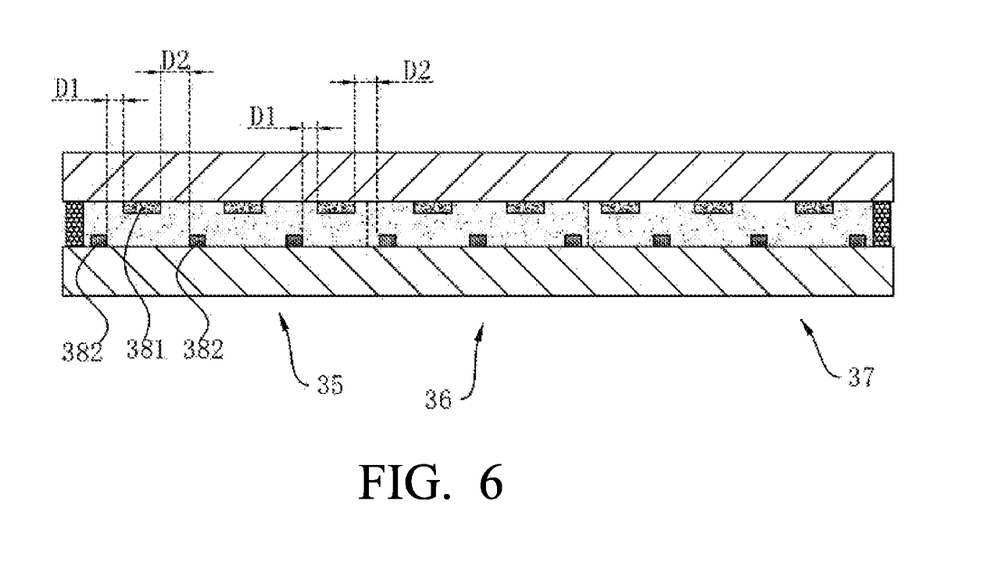
FIG. 6 is a schematic structural diagram of a curved array substrate in a flat state according to an embodiment of the present disclosure.

As shown in FIG. 6, it should be noted that, the left-side area 35, the middle area 36, and the right-side area 37 of the curved display panel 30 are provided with a plurality of pixel modules 38 arranged in an array. The two adjacent pixel modules 38 have a shared light shielding block 382.

In an embodiment of the present disclosure, when the curved display panel 30 is in a flat state, a less distance between the pixel modules 38 and the middle area 36, the absolute value of the difference between D1 and D2 is less.

it should be noted that, for the skilled in the art, during the process of bending the flat display panel 20 into the curved display panel 30, in the pixel modules 38 which have a less distance to the middle area 36, a relative displacement is less between the pixel electrodes 381 and the light shielding blocks.

In an embodiment of the present disclosure, when the curved display panel 30 is in a flat state, in the pixel modules 38 which have a greatest distance to the middle area 36, the absolute value of the difference between D1 and D2 is a half of L.

It should be noted that, in actual implementation, in the pixel modules 38 which have a greatest distance to the middle area 36, the absolute value of the difference between D1 and D2 can also be set one third of L or other values, which will not be iterated herein.

EMBODIMENT 2

Figure 7:
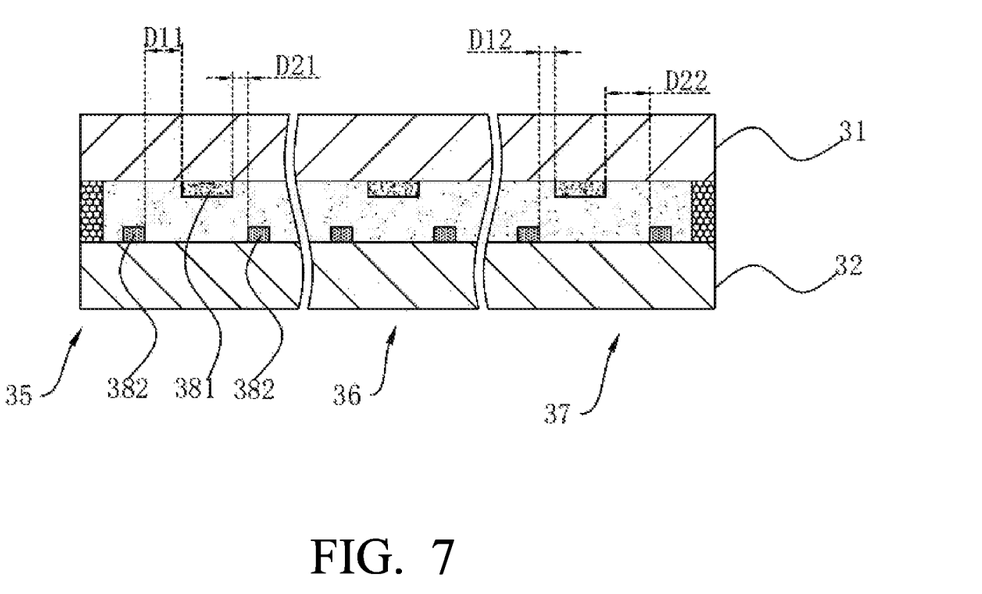
FIG. 7 is a schematic structural diagram of a flat display panel according to embodiment 2 of the present disclosure.
Figure 8:
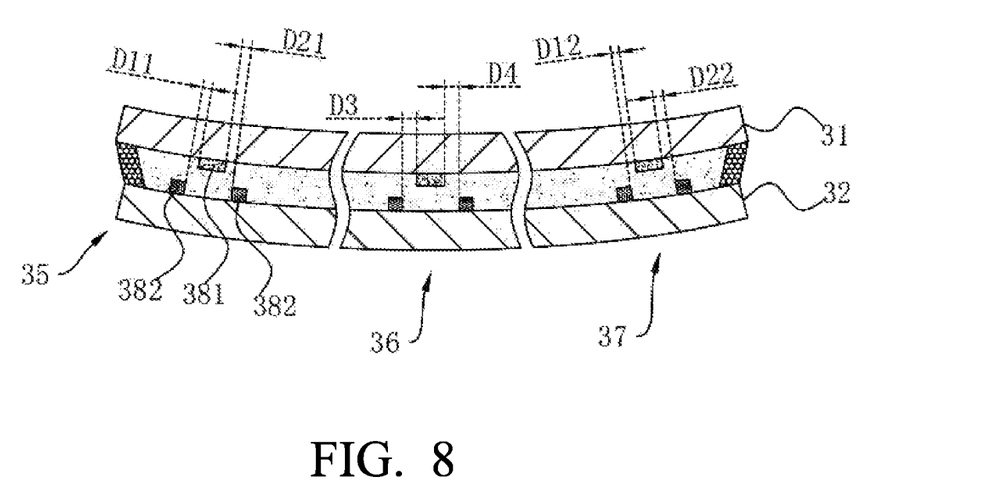
FIG. 8 is a schematic structural diagram of a curved display panel according to embodiment 2 of the present disclosure.

An embodiment of the present disclosure further provides a curved display panel. As shown in FIG. 7 and FIG. 8. The difference from embodiment 1 is that the display surface of the curved display panel 30 is convex.

Specifically, when the curved display panel 30 is in a flat state, D21 is less than D11, and D12 is less than D22.

It should be noted that, for the skilled in the art, when the surface that light emits from of the curved display panel 30 is a convex surface, during the process of bending the flat display panel 20 into the curved display panel 30, the left end of the curved array substrate 31 relatively shifts to left, and the right end relatively shifts to right. It can prevent bad phenomenon in the curved liquid crystal display panel, such as light leakage when obliquely viewing, caused by a greater relative shift produced between the light shielding blocks and the pixel electrodes 381 in the pixel modules 38 by setting D21 less than D11, and D12 less than D22 when the curved display panel 30 is in a flat state. Therefore, due to displacement compensation, D21 is equal to or is about equal to D11, and D12 is equal to or is about equal to D22 when the flat display panel 20 is bent to the curved display panel 30.

Figure 9:
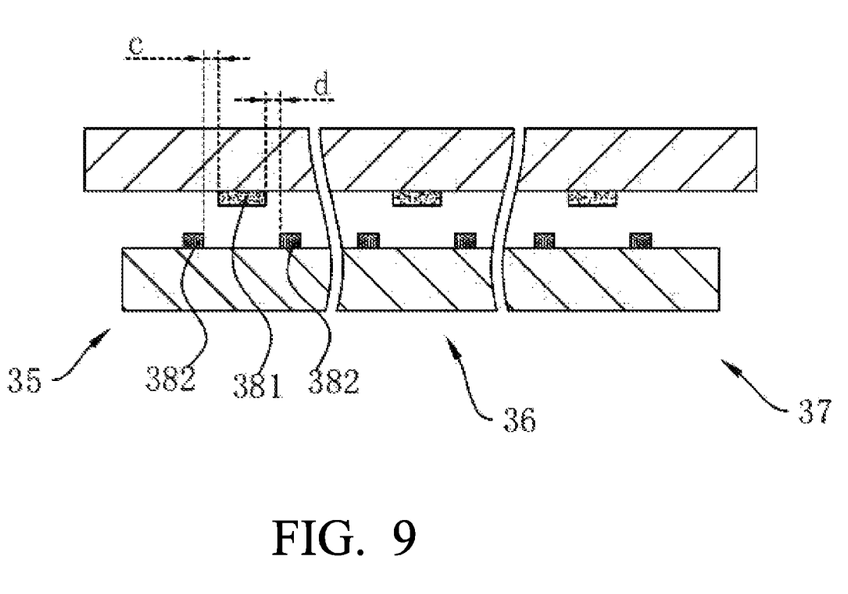
FIG. 9 is a schematic structural diagram of an orthographic projection of the curved array substrate and the curved color filter substrate in the horizontal plane according to embodiment 2 of the present disclosure.

In an embodiment of the present disclosure, as shown in FIG. 9, FIG. 9 is a schematic structural diagram of an orthographic projection of the curved array substrate and the curved color filter substrate in the horizontal plane according to embodiment 2 of the present disclosure.

In each of the pixel modules 38, the distances from the pixel electrodes 381 to the light shielding blocks on the both sides of the pixel electrodes 381 are c and d, respectively. When c is equal to or is about equal to d, it can obtain better display quality and improve optical quality of the curved display panel 30 no matter when a viewer obliquely watches the curved display panel 30 or not.

The beneficial effect of the embodiments of the present disclosure is that: it compensates the displacement between the pixel electrodes 381 and the corresponding light shielding blocks caused by dislocation or relative shifts between the curved array substrate 31 and the color filter substrate during the process of bending the flat display panel 20 into the curved display panel 30 by designing the distance between the pixel electrodes 381 in the sub-pixels and the light shielding blocks on the left and right sides to be asymmetrical in the side area of the flat display panel 20, thereby preventing color shift, dark-state light leakage, and nonuniform brightness when a viewer obliquely watches the side area of the curved liquid crystal display panel that causing a decrease of display quality. It can improve optical quality of the curved display panel 30 without increasing the number of masks.

The present disclosure has been described with a preferred embodiment thereof. The preferred embodiment is not intended to limit the present disclosure, and it is understood that many changes and modifications to the described embodiment can be carried out without departing from the scope and the spirit of the disclosure that is intended to be limited only by the appended claims.

What is claimed is:

1. A curved display panel, comprising a curved color filter substrate, a curved array substrate, and a liquid crystal layer; the curved array substrate is provided with a plurality of pixel electrodes disposed at intervals, the curved color filter substrate is provided with a plurality of light shielding blocks disposed at intervals, and the light shielding blocks and the pixel electrodes are interlacedly disposed; the curved display panel comprises a plurality of pixel modules, and each of the pixel modules comprises one of the pixel electrodes and two of the light shielding blocks which are disposed on both sides of the adjacent pixel electrode;
wherein the curved display panel comprises a middle area and a side area disposed on both sides of the middle area; in each pixel module in the side area of the curved display panel, distances from an orthographic projection of the pixel electrode on the curved color filter substrate to the two light shielding blocks are D1 and D2, when the curved display panel is in a flat state, D1 is not equal to D2, and when the curved display panel is in a curved state, D1 is equal to D2;
when the curved display panel is in a curved state, the curved color filter substrate and the curved array substrate have straight edges and curved edges, a distance in the horizontal direction between the straight edges of the curved color filter substrate and the corresponding straight edges of the curved array substrate is L, and in each of the pixel modules, an absolute value of a difference between D1 and D2 is less than or equal to L; when the curved display panel is in a flat state, a less distance between the pixel modules and the middle area, the absolute value of the difference between D1 and D2 is less.

2. The curved display panel according to claim 1, wherein in each pixel module in the middle area of the curved display panel, distances from an orthographic projection of the pixel electrode on the curved color filter substrate to the two light shielding blocks are D3 and D4, and when the curved display panel is in a flat or curved state, D3 is equal to D4.

3. The curved display panel according to claim 1, wherein the side area of the curved display panel comprises a left-side area disposed on a left side of the middle area, and a right-side area disposed on a right side of the middle area; in each pixel module in the left-side area of the curved display panel, a distance from the orthographic projection of the pixel electrode on the curved color filter substrate to a light shielding block on the left side of the pixel electrode is D11, and a distance from the orthographic projection of the pixel electrode on the curved color filter substrate to a light shielding block on the right side of the pixel electrode is D21; when the curved display panel is in a flat state, D11 is not equal to D21, and when the curved display panel is in a curved state, D11 is equal to D21.

4. The curved display panel according to claim 3, wherein in each pixel module in the right-side area of the curved display panel, a distance from the orthographic projection of the pixel electrode on the curved color filter substrate to a light shielding block on the left side of the pixel electrode is D12, and a distance from the orthographic projection of the pixel electrode on the curved color filter substrate to a light shielding block on the right side of the pixel electrode is D22; when the curved display panel is in a flat state, D12 is not equal to D22, and when the curved display panel is in a curved state, D12 is equal to D22.

5. The curved display panel according to claim 4, wherein a display surface of the curved display panel is a concave surface, and when the curved display panel is in a flat state, D21 is greater than D11, and D12 is greater than D22.

6. The curved display panel according to claim 4, wherein a display surface of the curved display panel is a convex surface, and when the curved display panel is in a flat state, D21 is less than D11, and D12 is less than D22.

7. The curved display panel according to claim 3, wherein the pixel modules in the left-side area of the curved display panel and the pixel modules in the right-side area of the curved display panel are symmetric with respect to the middle area.

8. The curved display panel according to claim 1, wherein when the curved display panel is in a flat state, in the pixel modules which have a greatest distance to the middle area, the absolute value of the difference between D1 and D2 is a half of L.

9. A curved display panel, comprising a curved color filter substrate, a curved array substrate, and a liquid crystal layer; the curved array substrate is provided with a plurality of pixel electrodes disposed at intervals, the curved color filter substrate is provided with a plurality of light shielding blocks disposed at intervals, and the light shielding blocks and the pixel electrodes are interlacedly disposed; the curved display panel comprises a plurality of pixel modules, and each of the pixel modules comprises one of the pixel electrodes and two of the light shielding blocks which are disposed on both sides of the adjacent pixel electrode;
wherein the curved display panel comprises a middle area and a side area disposed on both sides of the middle area; in each pixel module in the side area of the curved display panel, distances from an orthographic projection of the pixel electrode on the curved color filter substrate to the two light shielding blocks are D1 and D2, when the curved display panel is in a flat state, D1 is not equal to D2, and when the curved display panel is in a curved state, D1 is equal to D2.

10. The curved display panel according to claim 9, wherein in each pixel module in the middle area of the curved display panel, distances from an orthographic projection of the pixel electrode on the curved color filter substrate to the two light shielding blocks are D3 and D4, and when the curved display panel is in a flat or curved state, D3 is equal to D4.

11. The curved display panel according to claim 9, wherein the side area of the curved display panel comprises a left-side area disposed on a left side of the middle area, and a right-side area disposed on a right side of the middle area; in each pixel module in the left-side area of the curved display panel, a distance from the orthographic projection of the pixel electrode on the curved color filter substrate to a light shielding block on the left side of the pixel electrode is D11, and a distance from the orthographic projection of the pixel electrode on the curved color filter substrate to a light shielding block on the right side of the pixel electrode is D21; when the curved display panel is in a flat state, D11 is not equal to D21, and when the curved display panel is in a curved state, D11 is equal to D21.

12. The curved display panel according to claim 11, wherein in each pixel module in the right-side area of the curved display panel, a distance from the orthographic projection of the pixel electrode on the curved color filter substrate to a light shielding block on the left side of the pixel electrode is D12, and a distance from the orthographic projection of the pixel electrode on the curved color filter substrate to a light shielding block on the right side of the pixel electrode is D22; when the curved display panel is in a flat state, D12 is not equal to D22, and when the curved display panel is in a curved state, D12 is equal to D22.

13. The curved display panel according to claim 12, wherein a display surface of the curved display panel is a concave surface, and when the curved display panel is in a flat state, D21 is greater than D11, and D12 is greater than D22.

14. The curved display panel according to claim 12, wherein a display surface of the curved display panel is a convex surface, and when the curved display panel is in a flat state, D21 is less than D11, and D12 is less than D22.

15. The curved display panel according to claim 11, wherein the pixel modules in the left-side area of the curved display panel and the pixel modules in the right-side area of the curved display panel are symmetric with respect to the middle area.

16. The curved display panel according to claim 9, wherein when the curved display panel is in a curved state, the curved color filter substrate and the curved array substrate have straight edges and curved edges, a distance in the horizontal direction between the straight edges of the curved color filter substrate and the corresponding straight edges of the curved array substrate is L, and in each of the pixel modules, an absolute value of a difference between D1 and D2 is less than or equal to L.

17. The curved display panel according to claim 16, wherein when the curved display panel is in a flat state, in the pixel modules which have a greatest distance to the middle area, the absolute value of the difference between D1 and D2 is a half of L.

18. The curved display panel according to claim 9, wherein when the curved display panel is in a flat state, a less distance between the pixel modules and the middle area, the absolute value of the difference between D1 and D2 is less.

* * * * *